United States Patent [19]
Long et al.

[11] Patent Number: 6,146,262
[45] Date of Patent: Nov. 14, 2000

[54] SUPPORT STRUCTURE FOR EXPLOSION-CONTAINING TANK

[75] Inventors: John B. Long, Sarasota, Fla.; Donald Waits, El Cerrito, Calif.

[73] Assignee: Hydrodyne Incorporated, Sarasota, Fla.

[21] Appl. No.: 09/288,211

[22] Filed: Apr. 8, 1999

Related U.S. Application Data

[60] Provisional application No. 60/081,477, Apr. 10, 1998.

[51] Int. Cl.$^7$ ..................................................... A22C 9/00
[52] U.S. Cl. .............................. 452/141; 426/234; 99/451
[58] Field of Search ............................. 452/141; 426/234, 426/238, 281; 99/451

[56] References Cited

U.S. PATENT DOCUMENTS

| | | |
|---|---|---|
| 3,492,688 | 2/1970 | Godfrey . |
| 3,711,896 | 1/1973 | Guberman et al. . |
| 5,273,766 | 12/1993 | Long . |
| 5,328,403 | 7/1994 | Long ........................................ 452/141 |
| 5,588,357 | 12/1996 | Tomikawa et al. . |
| 5,841,056 | 11/1998 | Long et al. ............................. 452/141 |

FOREIGN PATENT DOCUMENTS

| | | |
|---|---|---|
| WO 97/45697 | 12/1997 | WIPO . |
| 9854975 | 12/1998 | WIPO . |

*Primary Examiner*—Willis Little
*Attorney, Agent, or Firm*—Browdy and Neimark

[57] ABSTRACT

An apparatus for containing the energy of a shock wave and a reaction pulse from an explosion used for tenderizing meat has an inner tank (50) for holding the meat and a watertight outer tank (100) within which the inner tank is held optionally immersed in water, and into which the inner tank can rebound downward from the force of the explosion. The outer tank includes an inner surface dissimilar in shape to the outer surface of the inner tank; this breaks up the initial shock wave. An air space at least partially surrounding the outer tank helps to contain the shock wave. The water, the inner tank, and outer tank act as an hydraulic damper or dash pot to cushion the force of the slower reaction pulse, which follows the shock pulse and pushes the inner tank downward.

18 Claims, 4 Drawing Sheets

SUPPORT STRUCTURE FOR EXPLOSION-CONTAINING TANK

CROSS-REFERENCE TO RELATED APPLICATIONS

This application claims priority from provisional application Ser. No. 60/081,477, filed Apr. 10, 1998, the entire contents of which are hereby incorporated by reference.

FIELD OF THE INVENTION

The present invention relates to the treatment of meat by exposing the meat to a shock wave, and especially for tenderizing meat and/or killing bacteria in the meat by such a treatment.

BACKGROUND OF THE INVENTION

The tenderizing of meat and the destruction of microorganisms on and in meat can be accompanied by generating a shock wave in a non-compressible fluid and allowing the shock wave to pass through meat, which is preferably sealed in a plastic bag for cleanliness and ease of handling.

The tenderizing effect can be roughly doubled by placing the meat adjacent a reflective surface in the water, such as heavy steel plate, which reflects the wave back through the meat. Thus, the shock wave front passes through the meat, reflects from such surface, and passes a second time through the meat, crossing a portion of the still incoming wave. The maximum effect occurs in the region of the supported meat where the reflected wave crosses the incoming wave.

For uniform shock intensity, the inside of a heavy steel hemispherical tank can be lined with meat packages and the inside of the tank filled with water. An explosive chemical charge is placed at the center point and detonated, or an electric spark is discharged to generate the shock wave which travels outward through the water, tenderizing all the meat relatively evenly.

Tenderizing meat in this manner has many advantages, including instant tenderization, low cost, and saving of energy, as well as killing of bacteria. There are no unsavory or known unhealthy results to the meat.

Explosive meat tenderizing is discussed in Long U.S. Pat. Nos. 5,328,403 and 5,273,766, both of which are entirely incorporated herein by reference. An improved water deflector is shown in Long et al U.S. Pat. No. 5,841,056 also incorporated by reference, and corresponding WO 97/456697. The process disclosed in these patents is known as the Hydrodyne Process. In the exemplary embodiments disclosed by these patents, the shock wave is produced by the detonation of a high explosive. It will be understood that large forces are generated by the explosions, which must be energetic enough to create a powerful shock wave and therefore are energetic enough to destroy common materials and break containment devices which are not strong enough.

The main containment device is a large stainless steel vessel or tank which includes a shock-reflective wall, several inches thick, of generally hemispherical shape. The generally hemispherical portion is preferably extended by a circular-cylindrical collar joining the hemisphere along its upper edge (a great circle) and extending upwardly. The collar provides a well for water above the central detonation point, the latter of which is at the upper edge of the hemispherical portion and the lower edge of the circular-cylindrical portion. The water above the detonation is necessary to contain the initial force of the explosion. Preferably the depth of the detonation point below the water surface in the filled tank is greater than the spherical radius of the hemisphere.

When an explosion occurs at the center of the tank, a shock wave travels outward in all directions initially at about 16,000 to 20,000 feet per second, which is well above the speed of sound and shock waves in water. When it impinges on the tank wall, the steel from which the wall is formed elastically stretches to a small degree due to the great amount of force. About 20% of all the explosion energy in the shock wave goes into hoop expansion. Typically 30% to 50% of all the explosion energy goes into the shock wave, so the total energy in hoop expansion is considerable. The force on the tank wall due to the shock wave is rapidly applied, rising to a peak in about 10 $\mu$s (10 microseconds). The shock pulse lasts for about 30 to 60 $\mu$s. The lower half of shock pulse wave front will partially rebound from the tank wall and partially pass through; the upper half will likewise partially rebound from the cylindrical portion of the tank steel wall and also from the air/water surface above. Echoes will bounce back and forth for some time.

After the shock wave pulse, a slower pulse pushes on the tank wall. The slower pulse is due to a reaction force caused by the upward surge of water which is pushed out of the tank by the expanding bubble of gas (steam in the case of an electrical-discharge explosion). This pulse lasts for about a period of as little as 0.2 to 0.4 ms (milliseconds), up to about 1 ms or even more. The peak downward reaction force caused by a typical chemical explosive charge of 0.3 kg (⅔ lb.) of TNT is at least 200,000 kg (440,000 pounds).

SUMMARY OF THE INVENTION

A general object of the invention is to better support the tank and thus to better absorb the shock wave without damage to the apparatus.

In the present invention the generally hemispherical-cylindrical tank is immersed in water or gas inside an outer tank. Water provides much more support than air due to its greater density. When the inner tank expands under the force of the shock wave impulse, it pushes hard against the water, but the water pushes back due to its inertia; the water is too heavy to be quickly moved outwardly. This helps to contain the inner tank and prevents it from accelerating downwardly to any great extent when the shock wave hits it.

However, the steel of the inner tank does move outwardly and a strong shock wave is set up in the containment water or gas outside the inner tank. This shock wave is not as strong as the shock wave inside the inner tank, because the wave partially reflects back toward the detonation point from the generally hemispherical inside surface of the inner tank; but it is still forceful.

The containment water is contained in the outer tank, which is preferably generally cylindrical, and also preferably made of suitably supported stainless steel. Because some shock wave energy is reflected back toward the detonation point, and because a shock wave (like sound) weakens as it expands outwardly, this outer tank need not be so thick and strongly built as the inner tank in which the meat is loaded.

In earlier attempts to better support and absorb the shock wave, the outer tank was lined with plastic foam such as open- or closed-cell polyurethane to provide a "mechanical impedance mismatch", which causes reflection of the wave. However, it was found that the foam used for reflecting (and partially absorbing) shock waves, even though it served the purpose, could not stand up to the impact. It came loose from the steel backing and the material itself was disintegrated by the shock waves passing through (like the meat being tenderized above). (Other types of foam or porous materials capable of standing up to the shock are within the scope of the present invention.)

When the speed of sound passing through two materials is different, there is a mechanical impedance mismatch at their boundary, and this causes shock waves to reflect from the boundary. The greater the mismatch, the more reflection. The mismatch between the greater speed of sound through stainless steel and the lesser speed of sound through water or air is what causes the shock wave to partially reflect from the inside of the inner tank surface. A second echo will reflect also from the outer surface of the inner tank, which is a second mismatch though the speed change is reversed and the shock wave is slowed instead of speeded up as at the inner surface. Another echo will reflect from the air or gas bubble created by the explosion so long as the air or gas bubble has not reached the surface of the water at the upper end of the meat-supporting inner tank.

In one preferred embodiment of the present invention, an inner wall of the outer tank is surrounded by mostly air on its exterior cylindrical surface. The air space has the shape of a bored cylinder; on the lower and outer surfaces of the air space is concrete. The bottom of the water-filled inner wall of the outer tank also rests directly on concrete. This arrangement provides the desired impedance mismatch without requiring fragile foam material.

There are two impedance mismatches which the shock wave encounters as it moves outwardly and downwardly: first water to air to steel, and then steel to air. However, since the inner wall of the outer tank wall is relatively thin, the shock wave behaves to some extent as though it were passing directly from water to air in the case of water being in the outer tank. Some of the shock wave reflects back into the containment water, and some passes through the air to the outer wall of the outer tank, supported by concrete.

If the inner tank has a uniform inner surface, such inner surface will be hit all at once by the shock wave. Unlike the inner tank, the outer tank is not hit all at once by the shock wave, e.g. due to a flat bottom. The wave encounters the outer tank at an angle instead of straight on and therefore the instantaneous force is less; the shock wave force is also spread out over time because the wave, hitting at an angle, travels along the surface. Energy absorption is thus spread out over space and time. Due to the many reflection surfaces, the shock wave will bounce all around until it dies out.

Thus, one aspect of the present invention is an outer containment space bounded by two dissimilar shapes (generally hemispherical and circular cylindrical in a first preferred embodiment or with irregularities in a second preferred embodiment). Another and related aspect is the provision of at least one mechanical impedance mismatch.

It has been found that better results are achieved with a variation, i.e. when the meat-holding inner tank is not precisely hemispherical, but instead has some irregular surfaces so as to provide increased shock reflections, while still retaining a generally hemispherical configuration. This may be achieved in a great variety of ways, including providing a flattened bottom to the generally hemispherical inner tank, and/or by providing a number of faceted flat surfaces along the generally hemispherical configuration, and/or by providing ribs, ridges, depressions, corrugations, etc. along such generally hemispherical surface.

A third aspect in the case where water is maintained in the outer tank is that the water-supporting wall of the outer tank is surrounded with air, which is less dense than water. Not only does the impedance mismatch cause reflection, but also the lower density of the air prevents it from carrying much energy as compared to the denser water. When an explosion occurs in a dense material, more of the energy is carried away by the shock wave; the limiting case is an explosion in a vacuum like that of outer space, where there is no shock wave at all and all the energy goes into other parts of the explosion.

The inner and water supporting wall of the outer tank is preferably surrounded by steel reinforcing plates which extend radially outwardly between the exterior of the inner wall of the outer tank and the outside of the cored-cylinder air space. The entire structure of inner tank, outer tank, and radiating reinforcements is preferably all one welded structure.

After a short time the shock wave will be greatly weakened due to numerous reflections, absorption by the steel, air and water it travels through, and radiation outwardly into the concrete and the air above the tanks. However, as soon as the shock force abates, the structure must be ready to endure the slower but powerful reaction pulse.

The water in the upper cylindrical portion of the inner tank is of course blown upwardly by the explosion, but due to the inertia of the water this takes much longer than the time it takes for the shock wave to travel outwardly. Because the water is heavy, the explosion must push on it for a while before it begins to move fast.

Because the reaction pulse is slower than the shock pulse, its main effect is to push the inner tank strongly downwardly as a unit. Here again, with water in the outer containment tank, such water resists the downward motion, but not mainly by holding still, but instead by moving. The inner tank is so strongly pushed downwardly by the reaction force that it is impractical to attempt to hold it in place. The energy it acquires from the explosion is dissipated by moving the water in the outer tank (if present) out of the way, and also, preferably, by suitable energy absorbing springs or the like.

In the case water or some other liquid is present in the outer tanks, as the inner tank begins to move downwardly, the water in the outer tank is compressed and its pressure rises. The pressure rises all through the water because liquid water is substantially incompressible. (The effect is unlike a shock wave, which raises the pressure only along the shock front instead of everywhere.) As the pressure rises, the water begins to squirt out of any opening it can find and also stretches its containment vessel, the inner wall of the outer tank. Both of these actions absorb energy and slow the downward motion of the inner tank. Preferably there is only a very small diameter difference between the outside of the inner tank and the inside of the outer tank, creating an annular orifice from which the water of the outer tank can spurt or squirt upwardly, dissipating energy.

The inner tank which holds the meat is preferably supported by springs, more preferably not only sufficient to support its weight when filled with water, but also sufficient to assist in absorbing much or all of the downward kinetic energy of the inner tank.

If water is present in the outer tank, the inner meat-supporting tank moving downwardly within the outer tank acts as an hydraulic shock absorber which serves very well to resist the force from the subsequent reaction pulse. However, unless the annulus between the inner tank and the outer tank is very small, the water in the outer tank cannot by itself support the inner tank against the downward force applied by the resultant gas bubble; as noted above, this downward force can last for as little as about 0.3 ms, which is still a sufficient period of time for the water to move easily through the annulus unless the annulus is very small.

Accordingly, even if water is present in the outer tank, the inner tank is desirably also supported by springs which, in one embodiment, can resist a load of about 500,000 lbs (roughly 22,725 kg).

However, when stiff springs are used to absorb the downward momentum of the inner tank, a great deal of energy is stored in such springs, so that in the release of-such energy the meat-supporting inner tank has a tendency to rebound in an undesirable fashion. Thus, when stiff springs are used as mentioned above, it is highly desirable to provide an additional stack of springs which oppose the first set, the additional stack serving to resist rebound of the inner tank.

It has also now been found that rubber washers in place of springs suffer from the same problem as the polyurethane foam, namely the inability to repeatedly withstand shock. Rubber washers absorb more energy when compressed than steel springs, but disintegrate after a few detonations because rubber acts like a rigid material when a force is applied too suddenly, and shatters. This phenomenon is illustrated by the toy material Silly Putty which has this characteristic to a greater degree than natural rubber and most synthetic rubbers, and shatters under impacts of ordinary rapidity, not caused by high explosives.

One preferred form of spring is the Belleville type, which has survived more than 500 detonations in a prototype apparatus according to the present invention.

In addition to the damping provided by the combination of the inner and water-filled outer tank, which acts as a giant hydraulic damper, one or more additional individual hydraulic dampers or dash pots can be used in the present invention. For example, a piston/cylinder with predetermined amount of leakage can be placed between the bottom of the inner tank and the floor of the outer tank. When the inner tank descends, this will provide additional damping. Alternatively, a circle of two or more dampers can be deployed around the center axis of the inner tank in the water. Or dampers can be provided around the inner tank but outside the water of the outer tank, either combined with or interspersed with the aforementioned springs.

As indicated above, the volume between the inner tank and the outer tank may simply be filled with air or another gas, rather than water. In this version, the entire load imposed by the downward motion of the inner tank is resisted and absorbed by the Belleville springs. The advantage of this version is the increased mechanical impedance mismatch between the outer surface of the inner tank and the air which now exists in the absence of water. The shock wave which is transmitted to the supporting environment (e.g. the floor and walls of the room in which the apparatus is installed) is considerably less when air replaces water between the inner and outer tanks. Belleville springs have been found to be adequate to support downward to motion of the inner tank, consisting of both the shock from the initial stage of the explosion and the subsequent downward push caused by the reaction pulse. If shock propagation to the surrounding environment is a problem, this version of the equipment is preferred.

With the arrangement of the present invention, a large inner tank holding up to 600 pounds (about 273 kg) of meat will recoil downwardly only about 2.5 inches (6 cm) upon detonation.

BRIEF DESCRIPTION OF THE DRAWING

The above and other objects and the nature and advantages of the present invention will become more apparent from the following detailed description of preferred embodiments taken in conjunction with drawings, wherein.

DETAILED DESCRIPTION OF THE PREFERRED EMBODIMENT

Figure 1:
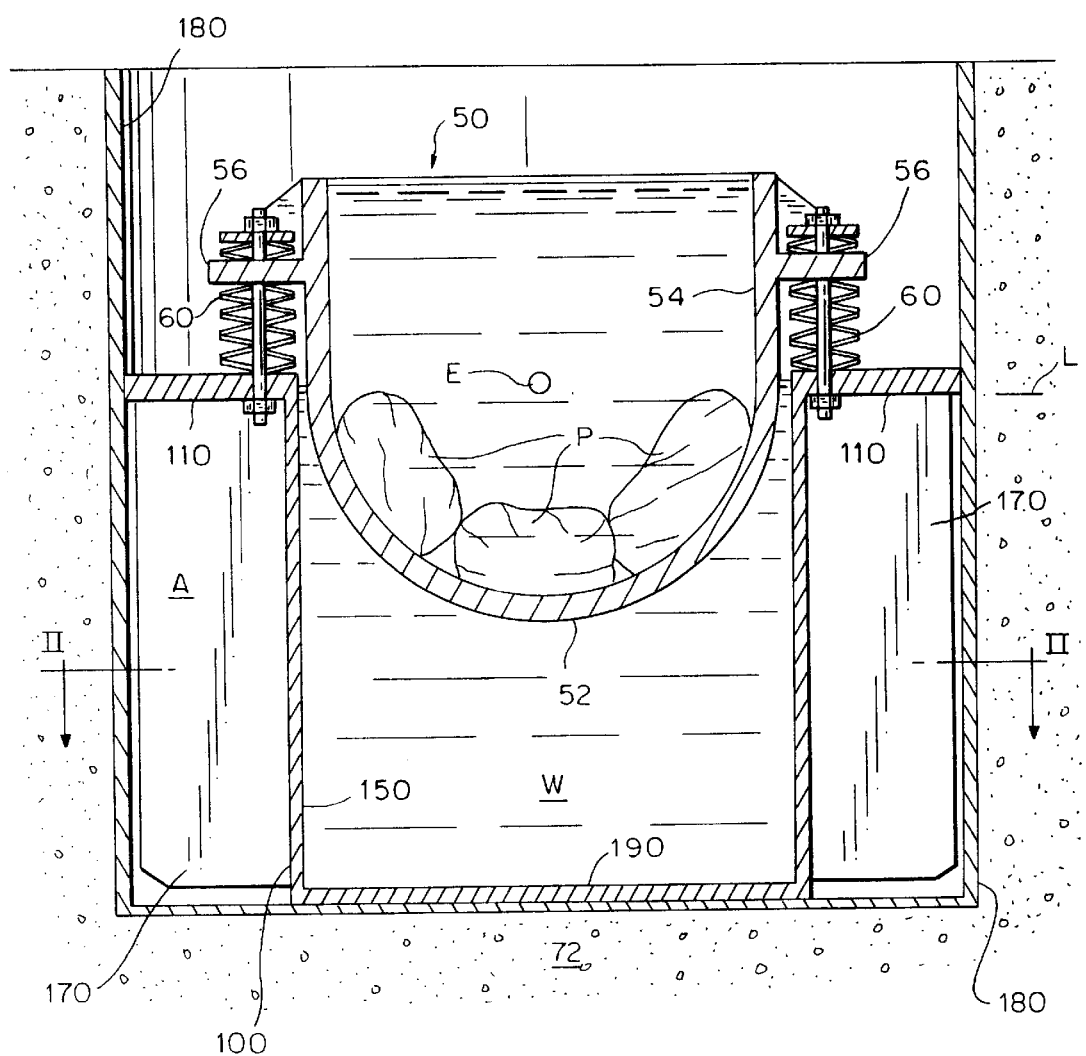
FIG. 1 is an elevational, cross-sectional, partially schematic view of an embodiment of the present invention.

FIGS. 1 illustrates a preferred embodiment of the invention, an apparatus for tenderizing meat. A meat-holding inner tank 50, preferably made of heavy stainless steel or other rugged, shock-resisting material such as described in the aforementioned Long patents, is held within a cylindrical wall 150, which itself can form the outer tank or which can constitute the inner wall of the outer tank, which wall 150 in turn is surrounded by concrete 72, or other shock-resistant material such as earth, crushed rock, etc., preferably retained by an outer wall 180 of the outer tank.

The inner tank 50 includes a preferably generally hemispherical lower portion 52 adapted to be lined with meat product P in heavy, sealed, water-tight plastic bags submerged in water. An upper portion 54 of the inner tank 50 is generally cylindrical and extends well above the source of the explosion, theoretically to a height greater than the radius of the hemisphere or more, although in practice a lesser height has been found sufficient. At the center E of curvature of the lower hemispherical part is the source of the explosion, i.e. an explosive device which may be a chemical explosive detonated by wires or a fuze (not shown) or a pair of electrodes coupled to a capacitor bank (not shown).

By extending the cylindrical portion 54 of the inner tank 50 sufficiently above the level of the generally hemispherical lower portion and the source of the explosion, the gas or air bubble created at the site of the explosion will not reach the surface of the liquid contained in the inner tank 50 prior to the shock wave, reflected from the generally hemispherical surface, reaching such bubble; and this insures a further reflection from such bubble due to the impedance mismatch at the boundary between the liquid, preferably water, and the air or gas bubble.

In one variation, the inner tank 50 is immersed in water W which fills the watertight inner wall 150 of the outer tank 100 up to its nominal fill level L, preferably at the upper lip as shown, so that the hemispherical lower portion of the inner tank 52 is immersed in the water W. In another variation, the water W is eliminated.

The inner tank 50 is desirably suspended on a support plate 110 concentric with the upper end of the inner wall 150 of the outer tank, which is preferably welded to the upper end of the inner wall 150 of the outer tank 100. The inner tank 50 rests on a series of springs 60, preferably Belleville springs, disposed in a circle around the exterior of the inner tank 50 and each bearing on the underside of a respective or preferably annular support bracket plate 56 on the cylindrical side of the inner tank upper portion 54 and, at the lower end, bearing on the support plate 110.

In addition to the inner wall 150, the outer tank 100 also includes a bottom plate 190 which is desirably water-tightly sealed, preferably by welding, to the inner wall 150. The inner surface of the inner wall 150 is preferably cylindrical or substantially cylindrical (e.g. polygonal if welded together from a number of flat steel plates). Optionally the outer tank 100 also includes an outer wall 180 which is also preferably generally cylindrical and is preferably embedded in or backed by concrete 72. An annular space filled with air A is between the inner wall 150 and the outer wall 180. The outer wall 180 may comprise a piece separate from the inner wall 150, bottom plate 190, and/or support plate 110, and be separable; or, the whole can be one integral, e.g. welded, assembly.

Figure 2:
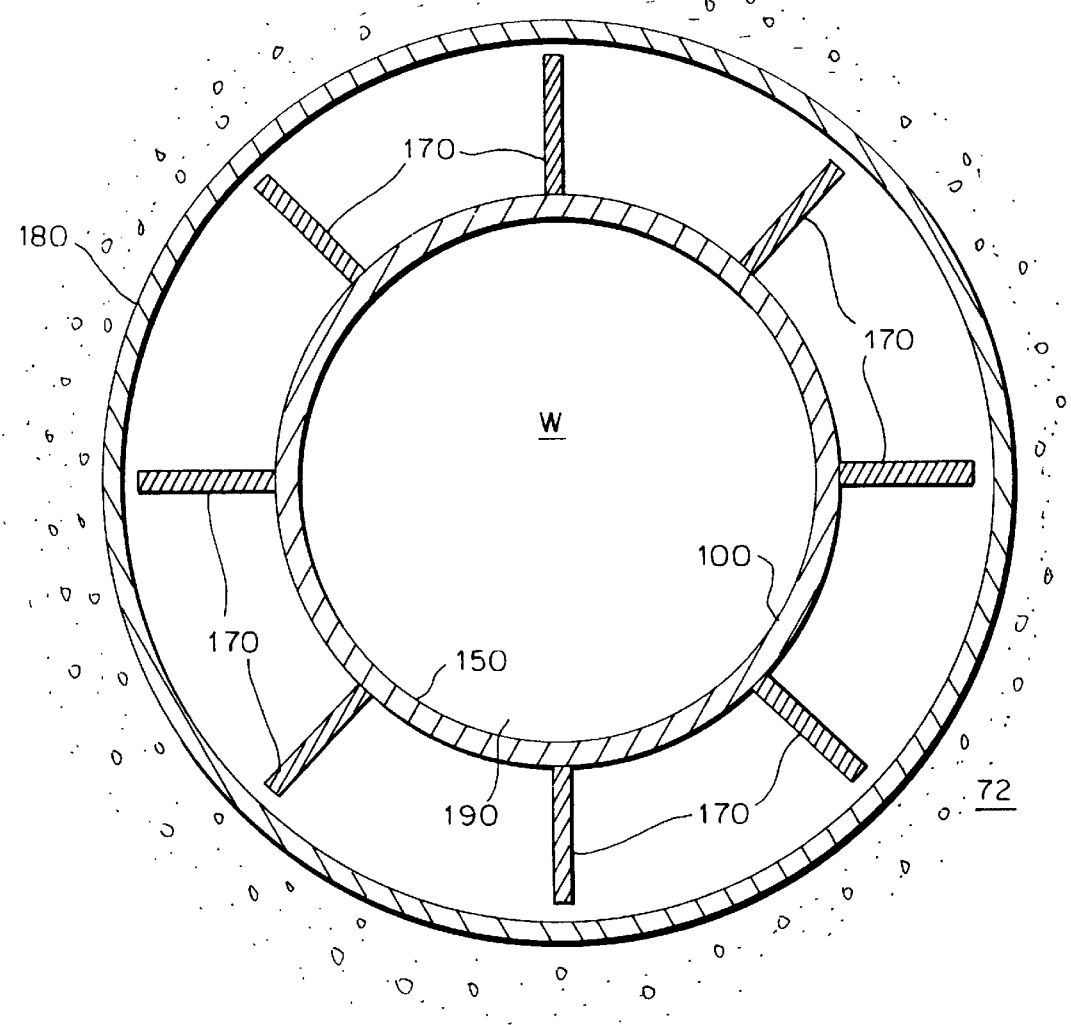
FIG. 2 is a cross-sectional plan view along lines II—II of FIG. 1.

FIG. 2 shows the inner tank wall 150 and the outer wall 180 in cross section along lines II—II of FIG. 1. As shown in FIG. 2, the outside of the inner wall 150 may include a number of radial reinforcing plates 170 preferably of steel and welded or otherwise attached to the wall 150 and preferably also the wall 180 to stiffen the wall 150 and limit its elastic inflation outwardly. The drawing shows the plates on the outer surface of the outer tank wall 150, but stiffeners can also be placed (alternatively or additionally) on the inside (not shown), as long as they do not interfere with the downward recoil of the inner tank 50. The inner wall 150 may also include annular hoops (not shown) for stiffening the wall 150 on either the inside or outside surfaces. The bottom plate 190 may also be stiffened. Instead of attachment by welding, such stiffening members alternatively may be attached by other means.

As discussed above, the outer tank's inner surface 150 is dissimilar in shape from the generally hemispherical outer surface of the inner tank, and the materials of the tanks (preferably stainless steel) have a mechanical impedance unequal to that of water; this causes the shock wave from the explosion to reflect, bouncing around inside the water after passing through the outer surface of the inner tank. The multiple reflections cause the shock wave energy to disperse. The illustrated circular-cylindrical shape is exemplary but preferred, and the exterior of the portion of the cylindrical inner tank 50 is radially complementary to the interior shape of the wall 150.

As seen in FIG. 1, the inner wall 150 of the outer tank is of a greater diameter than the outer diameter of the inner tank 50 so as to provide an annular rebound space for the inner tank to descend without resistance, except for resistance from the optionally present water W in the outer tank. The springs 60 are preferably very stiff to absorb the force of the reaction pulse reflected from the gas bubble, in addition to exerting enough upward force to support the weight of the inner tank 50 and contents including packaged meat and water, so that the inner tank effectively is free-floating in regard to such large forces as that of the explosion.

Water, if present below the inner tank 50, primarily supports the inner tank for the load produced by the shock wave. The reaction pulse which occurs after the shock wave imparts a downward velocity to the inner tank 50. At this later stage, the water W, if present, acts to some extent as an hydraulic damper depending on the size of the annular gap: the inner tank 50 acts as a piston and the outer tank 100 as a cylinder. The inner tank 50 displaces the water W in the outer tank as it descends. The water W squirts upwardly through the annular gap between the outer surface of the inner tank 50 and the inner surface of the inner wall 150 of the outer tank 100. If the gap is very narrow, the hydraulic damper effect is greater and the need for the springs 60 is lesser. The outer tank 100 can also include orifices or pipes (not shown) at other places through which the water W can be pushed by the downward motion of the inner tank 50.

Figure 3:
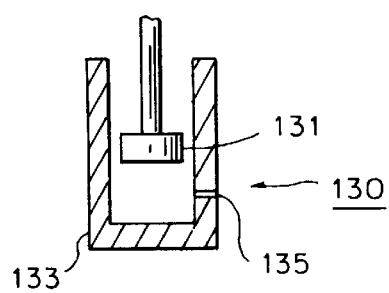
FIG. 3 is a cross-sectional view of a detail, namely a damper or dash pot used in certain preferred embodiments.

In one prototype, the annular gap is too wide to achieve sufficient damping. To augment the damping effect of the tanks 50 and 100 as described above, additional discrete shock absorbers, dash pots 130 or the like are preferably included in the present invention. FIG. 3 schematically shows a suitable dash pot 130. Dash pots can also be placed between the bottom of the inner tank 50 and the top of the bottom plate 190 (not shown), axially or in a circle concentric with the hemispherical axis, for example. Such hydraulic dampers can use the water W already in the tank 100 as a working fluid. Such dampers 130 may include a piston 131 moving inside a cylinder 133 as shown in FIG. 3. Either the piston or the cylinder may include a hole 135 to supplement or supplant the piston-bore gap.

If placed inside the springs 60, dash pots 130 can be sealed, oil-filled units, or can use the water W as the working fluid, depending on splashing to keep them filled. In one preferred embodiment, at least sixteen and more preferably thirty-two springs 60, each or most of which encircle a pneumatic dash pot as described below with respect to FIG. 5, extend in a circle about the inner tank 50. At a minimum, there should be at least three springs 60 spaced at 120°, each preferably encircling a dash pot 130 or 132.

Figure 4:
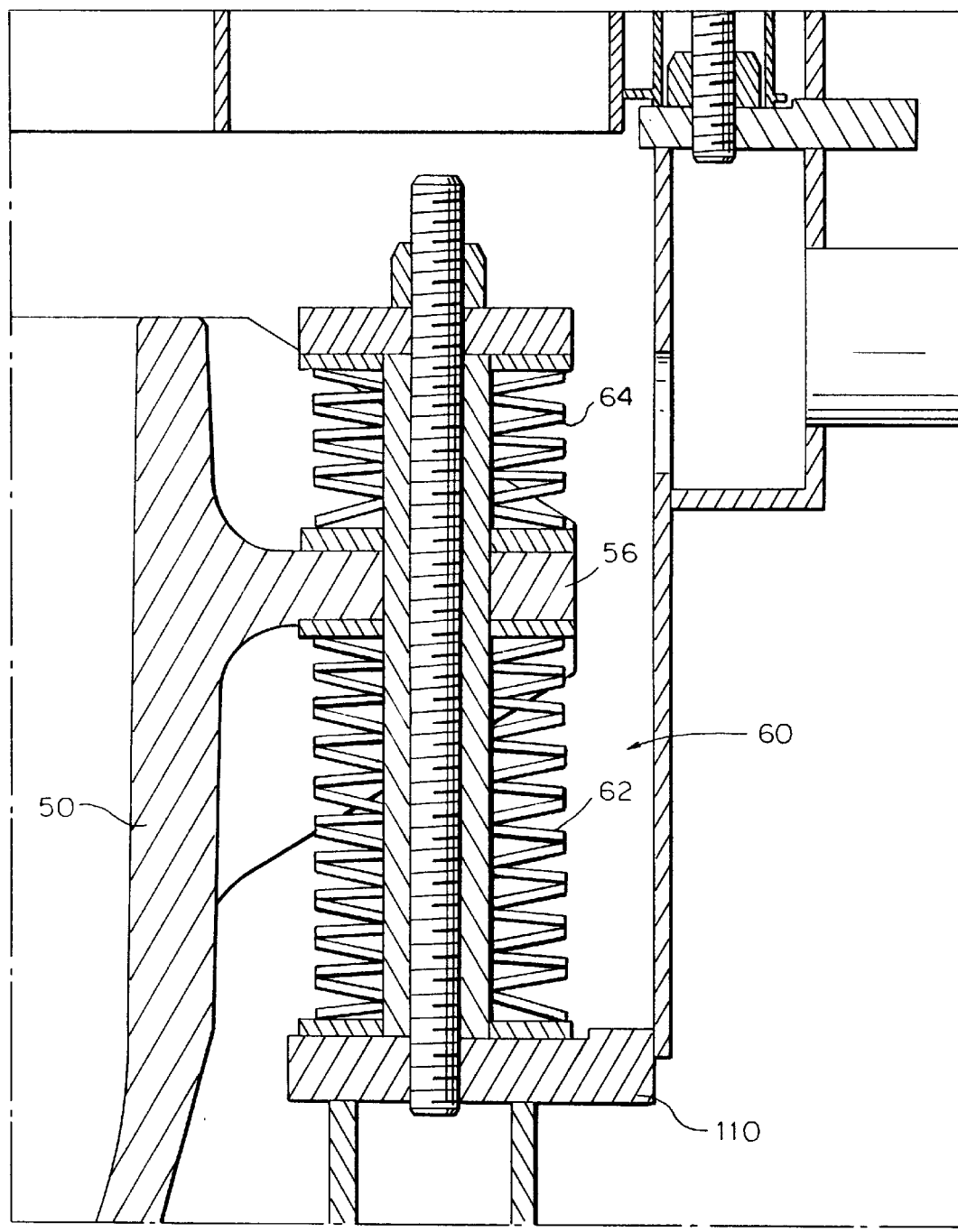
FIG. 4 is a cross-sectional recess of one of a plurality of Belleville spring sets for supporting the inner tank about its periphery.
Figure 5:
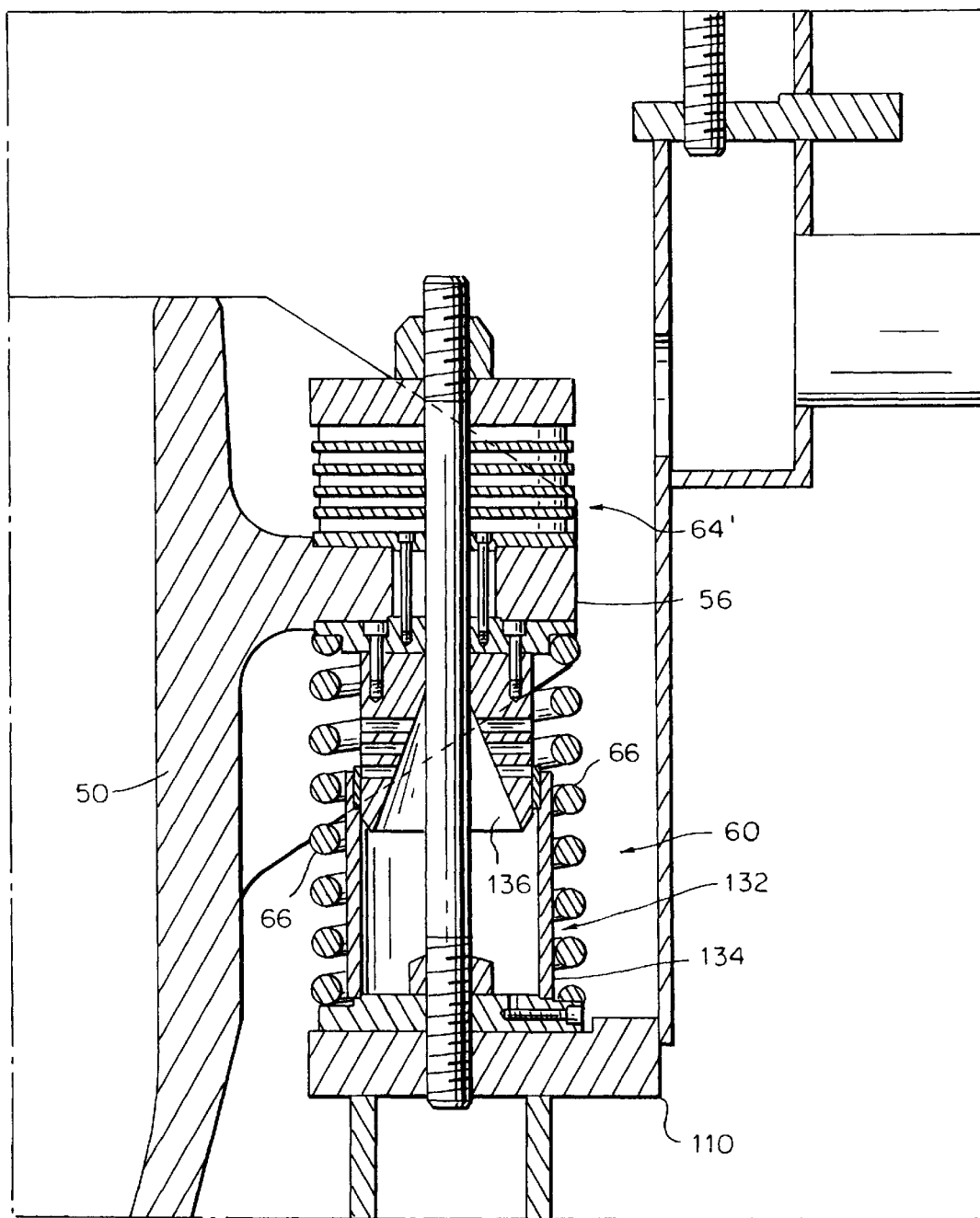
FIG. 5 is a cross-sectional view of another embodiment for peripherally supporting the inner tank.

FIGS. 4 and 5 show two different embodiments for the circumferentially disposed sets of springs 60. In FIG. 4, a set of vertically disposed Belleville springs 62 are provided. Belleville springs absorb the stored rebound energy very well, obviating the need for water W in the outer tank 100. In order to absorb the rebound energy, a second second set of Belleville springs 64 are provided above the support bracket plate 56.

The embodiment of FIG. 5 uses a coil spring 66 surrounding a pneumatic dash pot 132 including a cylinder 134 and a piston 136. The coil spring 66 on the outside of the dash pot 132 is sufficient to return the tank 50 and the water in the tank to its original position, while the function of the dash pot 132 is to absorb the majority of the reaction pulse. Elastomeric pads 641 suffice to absorb the rebound energy. The size of the dash pot 132 and spring 66 combination is preferably the same as the Belleville spring pack of FIG. 4, so that these are interchangeable and usable alternatively.

An explosion shield (not shown) may be provided above the inner tank 50 to absorb the resultant geyser. The shield may optionally be mounted on a shock-absorbing mounting (not shown) optionally including its own springs and dampers, e.g. such as shown in Long U.S. Pat. No. 5,841,056.

The present invention is applicable not only to the treatment of meat, but to any other product or substance which can benefit from shock-wave treatment.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . ." and "means for . . ." as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

The industrial applicability is in tenderizing meat, and/or killing bacteria in meat.

What is claimed is:

1. An apparatus for containing the energy of an explosion used for treating meat, the explosion causing a shock wave and a reaction pulse, the apparatus comprising:
   an inner tank (50) for holding the meat therein;
   an outer tank (100) optionally containing water within which the inner tank is at least partially disposed and air space at least partially surrounding the outer tank;
   the inner tank being vertically movable and biased to a first level relative to said outer tank;
   the outer tank including a rebound space for the inner tank to descend thereinto from said first level under force of the explosion;
   wherein the outer tank includes an inner surface at least partially dissimilar in shape to an outer surface of the inner tank, and the outer tank comprises a material having a mechanical impedance unequal to a mechanical impedance of water and air;
   whereby the shock wave from the explosion, after passing through the outer surface of the inner tank, is reflected from the inner surface of the outer tank and dispersed, a reaction pulse causes the inner tank to descend from said first level, and wherein the inner tank then returns to said first level.

2. The apparatus according to claim 1, comprising concrete substantially surrounding the air space.

3. In an apparatus for containing the energy of an explosion used for treating meat, the explosion causing a shock wave and a reaction pulse, comprising an inner tank (50) for holding the meat therein beneath an inert liquid, said inner tank being of a generally hemispherical shape, the improvement wherein
   said inner tank has an inner surface having irregularities thereon, so as to provide increased shock reflections.

4. The apparatus according to claim 3, further comprising an outer tank disposed beneath said inner tank, and a series of springs spaced about said inner tank and supporting said inner tank relative to said outer tank.

5. In an apparatus for containing the energy of an explosion used for treating meat, the explosion causing a shock wave and a reaction pulse, comprising an inner tank (50) for holding the meat therein beneath an inert liquid, said inner tank being of a generally hemispherical shape, the improvement wherein
   said inner tank has an inner surface having irregularities thereon;
   further comprising;
      a watertight outer tank (100) within which the inner tank is at least partially disposed, the inner tank being at least partially immersed in the water when the outer tank is filled to a fill level with the water;
      the outer tank including a rebound space for the inner tank to descend thereinto under force of the explosion;
      wherein the outer tank includes an inner surface at least partially dissimilar in shape to an outer surface of the inner tank, and the outer tank comprises a material having a mechanical impedance unequal to a mechanical impedance of water;
      whereby the shock wave from the explosion, after passing through the outer surface of the inner tank, is reflected from the inner surface of the outer tank and dispersed when the outer tank contains the water.

6. The apparatus according to claim 5, further comprising a series of springs spaced circumferentially about said inner tank and supporting said inner tank relative to said outer tank.

7. An apparatus for containing the energy of an explosion used for treating meat, the explosion causing a shock wave and a reaction pulse, the apparatus comprising:
   an inner tank (50) for holding the meat therein and having a generally cylindrical upper portion;
   an outer tank (100) containing water within which the inner tank is at least partially submerged, said outer tank having a generally cylindrical portion radially complimentary in shape to the outer generally cylindrical upper portion of said inner tank, there being a narrow gap between said inner tank and said outer tank;
   the inner tank being vertically movable and biased to a first level relative to said outer tank, wherein downward movement of said inner tank within water in said outer tank acts as an hydraulic damper with water jetting upwardly through said narrow gap;
   the outer tank including a rebound space for the inner tank to descend thereinto from said first level under force of the explosion;
   wherein the outer tank includes an inner surface at least partially dissimilar in shape to an outer surface of the inner tank, and the outer tank comprises a material having a mechanical impedance unequal to a mechanical impedance of water and air;
   whereby the shock wave from the explosion, after passing through the outer surface of the inner tank, is reflected from the inner surface of the outer tank and dispersed, a reaction pulse causes the inner tank to descend from said first level, and wherein the inner tank then returns to said first level.

8. The apparatus according to claim 7, wherein the outer surface of the inner tank includes a generally hemispherical lower portion.

9. The apparatus according to claim 7, comprising concrete surrounding the outer tank.

10. The apparatus according to claim 7, comprising a series of springs spaced circumferentially about said inner tank and supporting said inner tank relative to said outer tank.

11. The apparatus according to claim 10 wherein at least some of said springs comprise or encircle dash pots.

12. The apparatus of claim 7 wherein said narrow gap is annular.

13. An apparatus for containing the energy of an explosion used for treating meat, the explosion causing a shock wave and a reaction pulse, the apparatus comprising:
   an inner tank (50) for holding the meat therein;
   an outer tank (100) optionally containing water within which the inner tank is at least partially disposed;
   the inner tank being vertically movable and biased to a first level relative to said outer tank;
   the outer tank including a rebound space for the inner tank to descend thereinto from said first level under force of the explosion;

a series of springs spaced circumferentially about said inner tank and supporting said inner tank relative to said outer tank to at least in part provide said biasing;

a series of hydraulic dampers spaced circumferentially about said inner tank between said inner tank and said outer tank;

whereby the shock wave from the explosion, after passing through the inner tank, is reflected from the outer tank and dispersed, a reaction pulse causes the inner tank to descend from said first level with energy being absorbed by said hydraulic dampers, and wherein the inner tank then returns to said first level under the action of said springs.

14. The apparatus of claim 13 wherein said hydraulic dampers comprise dash pots.

15. The apparatus according to claim 14 wherein at least some of said springs are coil springs which encircle at least some of said dash pots.

16. The apparatus according to claim 13 wherein the outer tank includes an inner surface at least partially dissimilar in shape to an outer surface of the inner tank, and the outer tank comprises a material having a mechanical impedance unequal to a mechanical impedance of water and air.

17. The apparatus of claim 13 wherein said outer tank comprises a series of radially projecting plates (170) extending therefrom.

18. The apparatus of claim 13 wherein said springs comprise Bellville springs.

\* \* \* \* \*